United States Patent
James (10) Patent No.: US 10,424,337 B2
(45) Date of Patent: Sep. 24, 2019

(54) SEQUENTIAL METHOD FOR THE PRESENTATION OF IMAGES WITH ENHANCED FUNCTIONALITY, AND APPARATUS THEREOF

(71) Applicant: Saronikos Trading and Services, Unipessoal Lda, Funchal, Madeira (PT)

(72) Inventor: Robert James, Hatfield (GB)

(73) Assignee: SARONIKOS TRADING AND SERVICES, UNIPESSOAL LDA, Funchal, Maderia (PT)

( * ) Notice: Subject to any disclaimer, the term of this patent is extended or adjusted under 35 U.S.C. 154(b) by 0 days.

(21) Appl. No.: 15/308,127

(22) PCT Filed: May 2, 2014

(86) PCT No.: PCT/EP2014/059009
§ 371 (c)(1),
(2) Date: Nov. 1, 2016

(87) PCT Pub. No.: WO2015/165549
PCT Pub. Date: Nov. 5, 2015

(65) Prior Publication Data
US 2017/0053672 A1    Feb. 23, 2017

(51) Int. Cl.
*G11B 27/029* (2006.01)
*G11B 27/034* (2006.01)
(Continued)

(52) U.S. Cl.
CPC ............ *G11B 27/029* (2013.01); *G06F 3/165* (2013.01); *G11B 27/034* (2013.01); *G11B 27/10* (2013.01);
(Continued)

(58) Field of Classification Search
CPC ..... G11B 27/029; G11B 27/034; G11B 27/10; G11B 27/105; G11B 27/34; H04N 21/47205; G06F 3/165
See application file for complete search history.

(56) References Cited

U.S. PATENT DOCUMENTS 6,774,939 B1 * 8/2004 Peng .................. G03B 17/24
                                                  348/231.2
6,778,760 B1    8/2004 Kagle
(Continued)

FOREIGN PATENT DOCUMENTS

EP          1498899      1/2005
WO    WO 2004/109538   12/2004
(Continued)

OTHER PUBLICATIONS

International Search Report for Application No. PCT/EP2014/059009 dated Jun. 26, 2014.
(Continued)

*Primary Examiner* — Mishawn N. Hunter
(74) *Attorney, Agent, or Firm* — Workman Nydegger (57) ABSTRACT

A method involving associating a first audio track to a first image stored in memory means associated with a processor; associating a second audio track to a second image stored in said memory means; selecting said first image and said second image for sequential presentation; reproducing said first image for a first length of time of said first audio track; and subsequently reproducing said second image for a second length of time of said second audio track. The step of associating a first audio track to a first image and the step of associating a second audio track to a second image provide for storing a first identification code of the first audio track in first metadata of said at least first image, and storing
(Continued)

a second identification code of the second audio track in second metadata of said at least one second image.

19 Claims, 4 Drawing Sheets

(51) Int. Cl.
| | |
|---|---|
| *G11B 27/10* | (2006.01) |
| *G11B 27/34* | (2006.01) |
| *G06F 3/16* | (2006.01) |
| *H04N 21/472* | (2011.01) |
| *G06F 3/0481* | (2013.01) |
| *G06F 3/0484* | (2013.01) |

(52) U.S. Cl.
CPC ............ *G11B 27/105* (2013.01); *G11B 27/34* (2013.01); *H04N 21/47205* (2013.01); *G06F 3/04817* (2013.01); *G06F 3/04845* (2013.01)

(56) References Cited

U.S. PATENT DOCUMENTS

| | | |
|---|---|---|
| 2004/0054542 A1 | 3/2004 | Foote et al. |
| 2004/0147842 A1 | 7/2004 | Desmarais |
| 2005/0135790 A1 | 6/2005 | Hutten |
| 2005/0234985 A1 | 10/2005 | Gordon et al. |
| 2007/0233295 A1* | 10/2007 | Laefer ................... G11B 27/10 700/94 |
| 2011/0237187 A1* | 9/2011 | Yoneda ................... H04L 67/34 455/41.1 |
| 2011/0276567 A1* | 11/2011 | Asikainen ......... G06F 17/30743 707/728 |
| 2013/0298003 A1* | 11/2013 | Nikankin .............. G06F 17/241 715/230 |

FOREIGN PATENT DOCUMENTS

| | | |
|---|---|---|
| WO | WO 2006/043220 | 4/2006 |
| WO | WO 2008/002936 | 1/2008 |

OTHER PUBLICATIONS

MPV™ Music Profile Specification, Revision 1.00, Jan. 7, 2004, XP-002386288, OSTA. Org-Optical Storage Technology Association, http://www.osta.org/mpv/public/specs/MPVMusic-Prof-Spec-1.00.PDF.

DIG35 Specification: Metadata for 1-19 Digital Images—Version 1.1 , Internet Citation, Jun. 18, 2001 (Jun. 18, 2001), XP002224803, Retrieved from the Internet: URL:http://www.nkp.cz/start/knihcin/digit/vav23/DIG35.pdf [retrieved on Nov. 21, 2002] Annex C.3.9 Audio Appendix II : Metadata Association: II.I.(2) External Model Annex C.3.3 Capture Time and Date.

* cited by examiner

ND FOR THE
SEQUENTIAL METHOD FOR THE PRESENTATION OF IMAGES WITH ENHANCED FUNCTIONALITY, AND APPARATUS THEREOF

The present application claims priority from International Patent Application No. PCT/EP2014/059009 filed on May 2, 2014, the disclosure of which is incorporated herein by reference in its entirety.

FIELD OF THE INVENTION

It is noted that citation or identification of any document in this application is not an admission that such document is available as prior art to the present invention.

The present invention relates to a method for the sequential presentation of images with enhanced functionality, and apparatus thereof.

Nowadays, the use of digital cameras is highly widespread, such as the stand-alone type, or incorporated in tablets and smartphones, where the many photos taken with the same are stored on a computer, rather than on the tablet or smartphone itself, or even on dedicated devices, commonly referred to as electronic frames. The user of such digital devices therefore tends to organize digital photos and images according to his needs and through the tools available, and very often wants to review the photos through a sequential presentation of images, the so-called "slideshow". In the course of the present description the term "slideshow" shall be considered synonymous with a sequential presentation of images.

A presentation of images is never totally complete without background music, because by adding music to a presentation, the use of images becomes even more engaging.

It is known that there are several programs available for creating slideshows that allow a user to add audio files to the presentation of images, in particular, a user has the option to select a folder or directory on a computer, which includes images, and then select one or more audio tracks as background music for the presentation.

However, in this situation, the images are generally reproduced in an alphabetical order based on their file name and have no association with nor are synchronous with chosen audio tracks, which are played in a completely autonomous manner with respect to the reproduction of the images. In addition, very often is the case that the user is forced to listen to an audio track more than once, since many programs include the so-called "looping" of the background music until all the selected images in the presentation have been displayed.

Other more recent slideshow programs, allow for creating a presentation using a tool commonly called a "storyboard", in which a user can insert the desired images, as well as transition effects between images and the accompanying audio, or background music. In particular, the sound of the audio tracks can be added in precise time positions so as that during the duration of which one or more images of the sequence are displayed. At the end of this phase of the project, the user can save the presentation and play it back as many times as desired.

However, if the user wants to change different pieces of background music for the slide show, the adding of audio tracks must be carried out modifying the entire presentation, also taking into account the timing of reproduction of the images and the duration of the audio tracks themselves. Moreover, once the presentation is saved, it remains unchanged. Therefore, if a user wishes to create a further presentation with a series of images and music already used in the previous presentation, it would be necessary to rework everything from the start creating a new project.

This is quite annoying especially considering the fact that a user may want to display more than once the same image that represents an event with the music that is appropriate to the event and chosen by said user.

Additionally, if the amount of photos and images chosen for the presentation is high, then the methods of the mentioned prior art are not appropriate, as they are time-consuming and require a great deal of time for the purpose of creating by a user a complete presentation with background music.

SUMMARY OF THE INVENTION

The aim of the present invention is therefore to indicate a method for the sequential presentation of images with enhanced functionality, and apparatus thereof, that allow to associate an audio track with one or more images in such a way that the association can be used whenever the user wants to create a presentation.

A second aim of the present invention is to indicate a method for the sequential presentation of images with enhanced functionality, and apparatus thereof, that allows to speed up the process of creating the presentation itself.

These and other aims of the invention are achieved with a method for the sequential presentation of images with enhanced functionality, and apparatus thereof, as claimed in the appended claims that form an integral part of the present description.

In summary, a method is described for the sequential presentation of images with enhanced functionality, and apparatus thereof, in which it is provided to associate an audio track to one or more images by storing an identification code of the audio track in the metadata of one or more images. After selecting the images for the presentation, the above feature allows the user to automatically play music associated with images, in particular viewing first of all the images associated with an audio track and then all the images associated to another audio track, so that the music playback doesn't suffer from unwanted interruptions.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
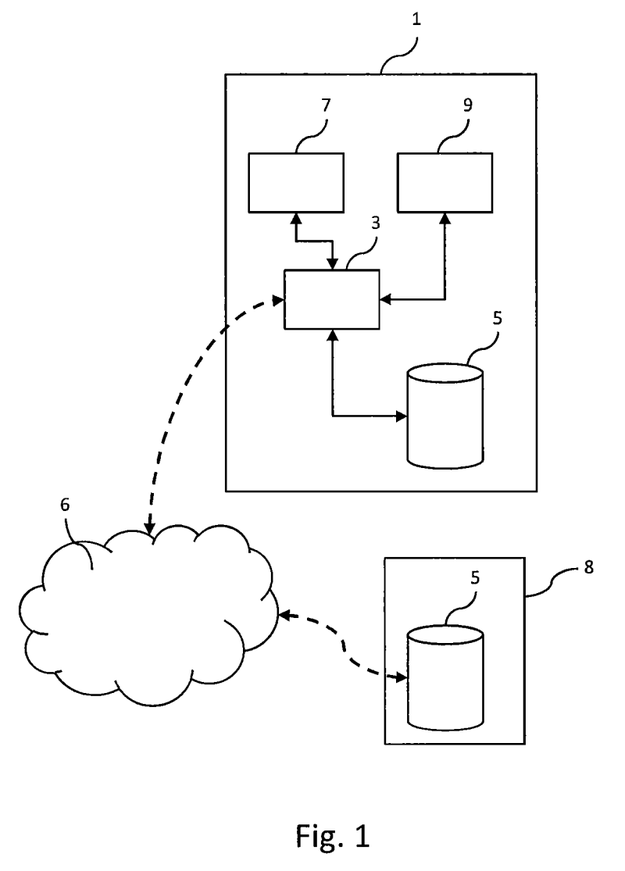
FIG. 1 shows an apparatus according to the present invention.

With reference to FIG. 1, an apparatus 1 is illustrated according to the present invention and enabled to implement the method that will be described in detail hereinafter.

The apparatus 1 is an electronic device designed to process and play images and music, in particular a computer, a tablet, a smartphone, a TV, a media console, a photo frame and so on. The apparatus 1 comprises a processor 3 associated to memory means 5 and connectable to display means 7 and sound producing means 9.

More in detail, the apparatus 1 may or may not include the memory means 5, in fact, such means may also be present on a remote storage server 8, for example a "cloud" type server, to which the apparatus 1 is able to access via a telecommunication network 6, for example the Internet network 6.

The apparatus 1 may include the display means 7 and sound producing means 9, or may be connected to them via appropriate interfaces. The connections by way of such interfaces to the display means 7 and sound producing means 9 can be easily implemented by an expert of the art.

The display means 7 include in particular a screen to display images, and the sound producing means 9 comprise one or more speakers to reproduce the sound of the music accompanying the slideshow.

The processor 3 is able to read image type files (e.g. JPEG, bitmap, png, etc.) and audio types files (such as the formats MP3, AAC, WMA, etc.). The processor 3 is connected to the memory means 5. Different file storage configurations are possible. For example, it is possible that the memory means 5 are included in the apparatus 1 and that it contains the image files, while the audio files are stored in the memory means 5 on the remote storage server 8, and vice versa, or both the audio files and the image type files are stored on the remote server storage 8, or even both audio files and the image type files are stored in the memory means 5 present in the apparatus 1.

Figure 2:
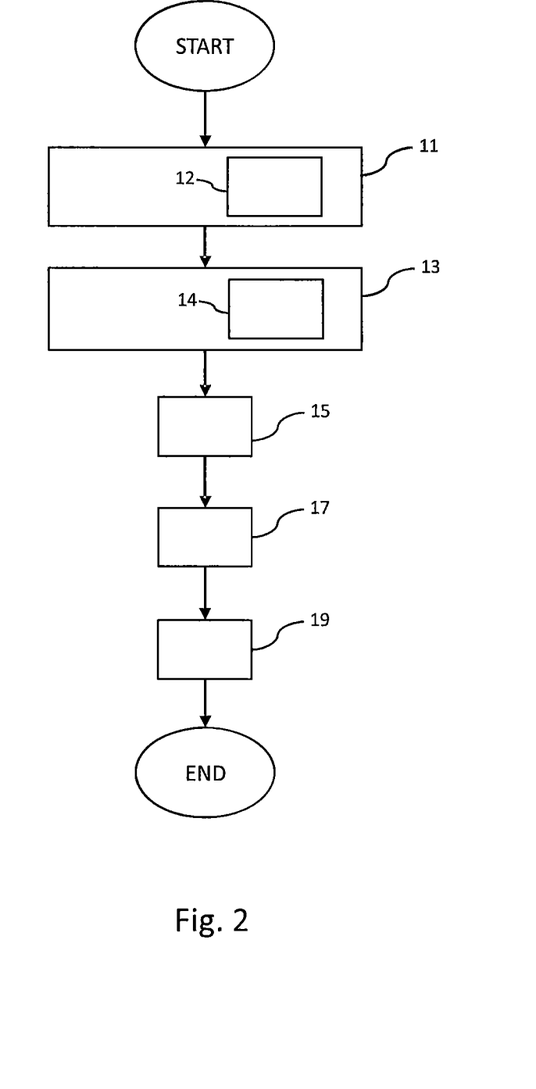
FIG. 2 illustrates a flow diagram of the method according to the present invention.

With reference to FIG. 2, a flow diagram of the method according to the present invention is illustrated.

The sequential presentation of images includes at least one image and is executable by the processor 3 adapted to enable the display of images on the display means 7 connected to it, the method for presenting images according to the present invention comprises the following steps:
  (Step 11) to associate a first audio track to at least one first image stored in the memory means 5 associated with said processor 3;
  (Step 13) to associate a second audio track to at least a second image stored in the memory means 5;
  (Step 15) to select said at least one first image and said at least one second image for said sequential presentation;
  (Step 17) to reproduce, by way of said processor 3 and on said display means 7, said at least one first image for a first length of time of said first audio track, acoustically reproducing said first audio track on sound producing means 9 connectable to said processor 3;
  (Step 19) to subsequently reproduce, by way of the processor 3 and on the display means 7, said at least one second image for a second length of time of said second audio track, acoustically reproducing said second audio track on sound producing means 9.

A distinct feature of the method according to the invention is that in which, the step of associating a first audio track to at least a first image and the step of associating a second audio track to at least a second image provide for step 12 to store a first identification code of said first audio track in the first metadata of said at least one first image and, at step 14, to store a second identification code of said second audio track in the second metadata of said at least one second image.

The method according to the invention also provides for:
  Reading in the first metadata of said at least one first image the first identification code of the first audio track, and respectively in the second metadata of said at least a second image read the second identification code of the second audio track, and
  Searching in the memory means 5, the first audio track corresponding to the first identification code, and respectively the second audio track corresponding to the second identification code for simultaneous playback of said at least one first image with the first audio track and then the simultaneous playback of said at least one second image with the second audio track.

The identification code of an audio track includes its file name or the name of the song or the name of the author. Alternatively, the identification code is a unique alphanumeric code of the audio file.

The method according to the invention shall now described with an example.

It is assumed that a user wants to create, by way of a computer, a sequential presentation of twenty images with accompanying music. The user wants to associate the audio track A to the first five images. To do this, the first five images are selected, for example by way of the computer mouse, and then select from a menu the option "Assign audio track". At this point, the user must choose the audio track from among those present in the memory means 5 mentioned above.

Once the audio track A has been selected, the processor 3 stores the identification code of the audio track A in the metadata of each of the first five images. Preferably, the method provides that the user can choose which identification code is stored in the metadata of the images, i.e. whether to store the audio file name, or the name of the song, or the author of the song, and so on.

Similarly, the user subsequently associates an audio track B with five other images and an audio track C to the remaining ten images.

At this point, if the user views the properties of the image files (which is possible for most of the operating systems currently in use), she/he would see that the metadata of each image includes a new field relative to the associated audio track, for example, called "Associated Audio Track", and enhanced with the identification codes of the selected audio tracks (A, B, and C in the example).

From the above description it is already clear how easy it is for a user to associate an audio track with one or more images. In fact, if hypothetically the user wanted to associate two hundred images with an audio track, it would be sufficient to select all the two hundred images, select the desired audio track, and then select the option "Assign audio track".

Alternatively, it is possible to edit individual metadata, namely by manually editing the value of the abovementioned field "Associated Audio Track", by directly entering the identification code of the selected audio track.

In another variant, the association is done by performing a dragging operation of the audio file on the file type of image. In particular, the user selects the desired audio track on the computer and with the help of a pointer (using the mouse or a finger on touch screens) physically drags the icon of the audio track towards the icon of the image file to associate it with. After this operation, commonly known as "Drag & Drop", the processor 3 automatically stores the identification code of the audio track in the metadata of the image.

Returning to the case of the example, once the association operations described have been carried out, the user selects the twenty images for the sequential presentation and inputs the command to the processor 3 to proceed with the presentation. The processor 3 reads the metadata of each of the twenty images, and in particular the identification code of the audio tracks A, B and C associated with them. For each audio track A, B and C, the processor 3 searches the corresponding audio file in the memory means 5 so as to identify the memory location useful for acoustic play-back during the presentation of the slideshow.

Figure 3:
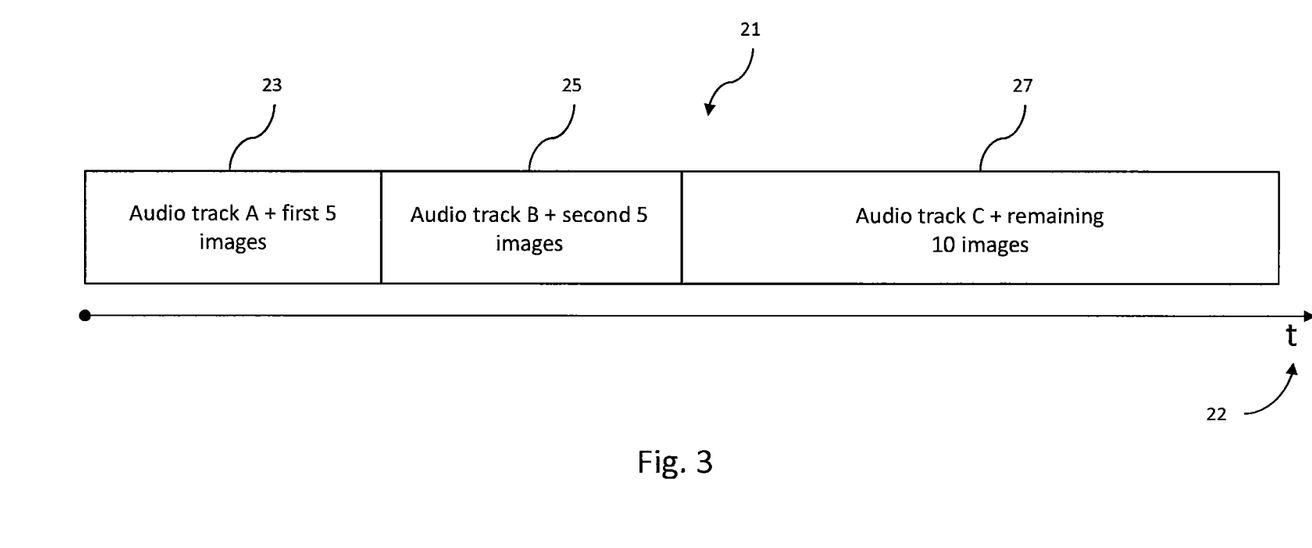
FIG. 3 shows a time sequence of a slide show of images according to the invention.

Once the audio tracks A, B and C have been identified in the memory means 5, the processor 3 orders the display sequence of the images by grouping the images by audio tracks, which will display the first five images in direct sequence for the duration the audio track A, then display the second five images in direct sequence for the duration of the audio track B, and finally display the remaining ten images in direct sequence for the duration of the audio track C. Within the time period 23 associated to the audio track A, as well as within the time period 25 associated to the audio track B and the time period 27 associated to the audio track C, the order in which the images are sequentially presented can be determined (in increasing or decreasing order) based on the taken date related to each image, which is one of the metadata stored in the image properties.

Otherwise the order of presentation of the images associated with the same audio track can be linked to the content of the images, for example, before all images containing landscapes can be displayed and then those contained people's faces (the latter being easily recognizable images thanks to progress made in digital photography in the field of face recognition). Or the order of presentation can be of random type.

At this point, the processor 3 starts a slideshow of the images with the background music, reproducing the twenty images on the screen 7 of the computer, and audio tracks A, B and C through the speakers 9.

Preferably, the method involves calculating for each audio track the display time of each image associated with it. For example, if the duration of the audio track A is five minutes then each of the first five images will be displayed for one minute. To do this, the processor 3 reads the length of time of the audio track in its metadata and then divides the value of the length of time by the number of images intended for the presentation, and associated with the same audio track, thus calculating the time for reproducing each image.

In a variation of the invention a maximum time could be provided, for example 10 seconds, for the display of each image and play-back of the related audio track. In this case, if the number of images and their playing time is not enough to finish the track associated with a certain group of images all having the same associated audio metadata, at the end of displaying such group of images, the music can be faded even if the track is not yet finished, before viewing and listening to the next set of images all having a different music track with a common metadata.

With reference to FIG. 3, a time sequence 21 of the images in reference to the example given above is illustrated. The time sequence 21 refers to the time axis 22 and includes a first block 23 in which are reproduced the first audio track A together with the first five images, a second block 25 in which are reproduced the second audio track B together with the second five images, and finally a third block 27 in which are reproduced the third audio track C together with the remaining ten images.

Optionally, the method according to the invention provides the possibility for the user to choose the temporal order in the slideshow of the audio tracks A, B and C. In this case, before the presentation starts, the user decides upon the order of the music, for example he/she wants the audio track C to be played first, then the audio track A and then finally the audio track B. In this case, the processor 3, before starting the presentation, reads the sequence of audio tracks set by the user and automatically sorts the twenty images based on their association with the respective audio tracks A, B and C. In particular, the processor 3 first of all reproduces for display the ten images in direct sequence for the duration of the audio track C, then reproduces the first five images in direct sequence for the duration of the audio track A, and finally reproduces the second five images in direct sequence for the duration of the audio track B.

In other words, the method according to the invention provides for ordering in a sequential timeline images for the presentation, grouping them by associated audio track. In this way, unwanted interruptions of each audio track are avoided.

It is clear that the number of images and audio tracks selected by the user for the presentation is absolutely variable, and does not change in any way the method according to the present invention.

The greater the number of associations made between audio tracks and images, the quicker presentations can be created. In fact, the created associations between audio tracks and images are stored in the metadata of the images, until the value of the identification code of the audio track for a certain image is changed again.

In the case the audio type file or image type file or both, are stored in a part of the memory means 5 that is located in the remote storage server 8, in order to reproduce a presentation, the processor 3 plays the files (image and/or audio), "streaming" them, by way of the telecommunications network 6, buffering their digital data in the remaining part of memory means 5 located in the apparatus 1.

Preferably, the method according to the invention provides for modifying the length of time of playback of a first audio track and/or the second length of time of a second audio track. For example, if the audio track A has a time duration of five minutes, the user is able to decide the portion of the audio track A to play with the images associated with it. In particular, if for example the user selects the portion of the audio track A limited within the first minute and the fourth minute of music, then the images associated with it will be displayed for three minutes, together with the aforesaid portion of the audio track A.

Also in this case it is provided to calculate for each audio track the display time of each single image associated with it.

Figure 4:
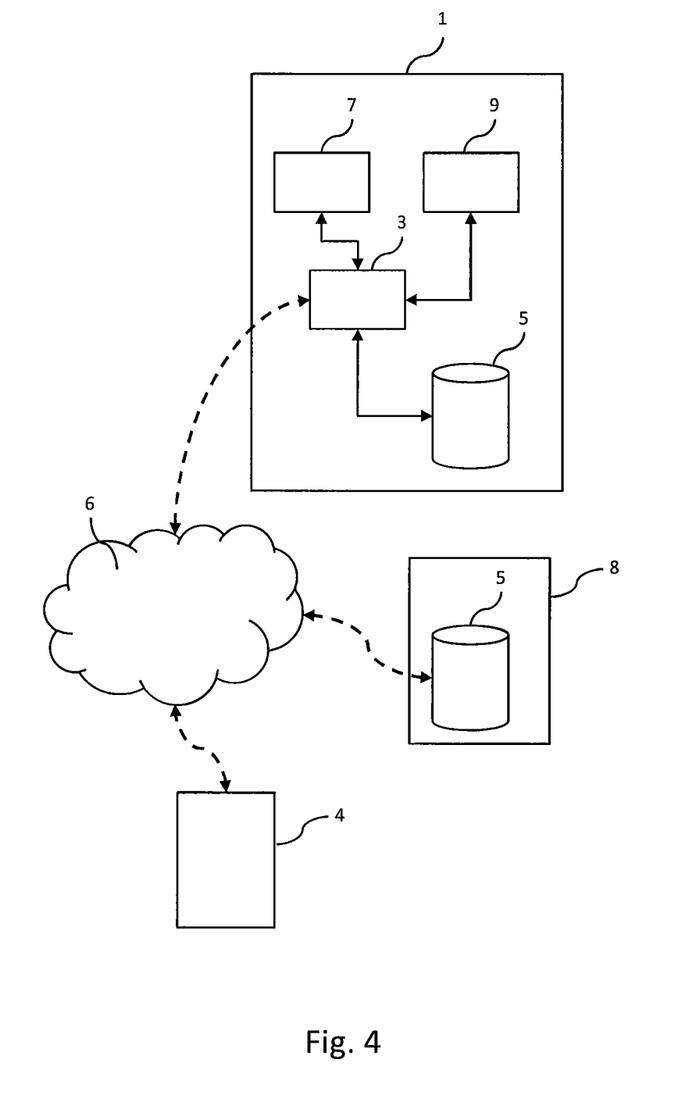
FIG. 4 illustrates a further embodiment of the apparatus of FIG. 1 according to the invention.

With reference to FIG. 4, when the search in the memory means 5 of a first audio track corresponding to a first identification code, and/or, respectively, of a second audio track corresponding to a second identification code is unsuccessful, the method according to the invention provides for downloading the first audio track, and/or the second audio track, from a second remote server 4 designed for distribution, namely the sale and/or rent, of music and accessible via the Internet 6 from said apparatus 1. The method therefore provides for storing the first audio track, and/or the second audio track, in the memory means 5, before their use for the sequential presentation of images.

This case may take place when a user edits the metadata of an image by manually entering the name of the audio file, rather than the name of the song.

For example, a user manually changes the metadata field "Associated Audio Track" of an image by entering the name of the song "Unforgettable". Next, the user decides to create a presentation that includes that image associated with the track "Unforgettable". The processor 3, as mentioned earlier, executes a search of the memory means 5 of the tracks chosen for the presentation, but in this example doesn't find the song "Unforgettable". At this point, preferably in a transparent manner for the user ("background mode"), the apparatus 1 connects via the Internet 6 to the second remote server 4 designed for the distribution of music and searches "Unforgettable" in its database. If the song "Unforgettable" is available for purchase and/or rent, the processor 3 sends a command to the second remote server 4 to confirm the download of the music file "Unforgettable". Said music file is then stored in the memory means 5, from where it will be ready for reproduction in the sequential presentation of images.

It is clear that this process can be performed automatically and transparently subject to subscribing to a sale and/or rental service. Moreover, the user may subscribe to various music distribution services.

Should the user not have access to the second remote server 4 (for example his/her subscription has expired, or the second remote server 4 is unavailable due to network problems, or the users logon credentials are not valid, etc.), the method according to the present invention provides for notifying the situation to the user via a visual and/or acoustic communication. In particular, the processor 3 composes a message, for example in the form of a "pop-up", to be displayed on the display means 7 and/or plays a sound via the acoustic producing means 9.

Preferably, the message includes information on the cause of the problem relating to accessing the service. For example, if the issue is related to invalid credentials, then the message will contain the following text: "Warning! Credentials to access the service are not valid. Verify Username and Password." Or, if the user's subscription has expired, then the message will contain the following text: "Warning! Subscription to the service has expired. Renew subscription."

Another possible variant is one in which the user is warned, via a visual and/or acoustic message, that the musical track is not present in the memory means 5 and the apparatus 1 will try to recover it from the second remote server 4 for the distribution of musical tracks. This message may be displayed on the display means 7 following two events.

The first occurrence takes place during the process of creating the presentation, that is, when the user decides to create a presentation that includes one or more images associated with an audio track that is not present in the memory means 5. The processor 3, as previously mentioned, performs a search in the memory means 5 of the chosen tracks for the presentation, but in such case is not able to locate the abovementioned audio track. As a result of this occurrence, the processor 3 processes, namely creates, the alert message and displays it on the display means 7. For example, the text of the message is: "Warning! The track 'xyz' is not present in memory." At this point, the creation of the presentation does not continue, nor the presentation of the images starts, and the user must associate a new audio track to the image or images.

The second occurrence takes place when the user, notwithstanding he/she is not preparing any presentation or displaying it, edits the metadata of an image by manually entering the identification code of the audio file for instance the name of the track. For example, a user manually changes the metadata field "Associated Audio Track" of an image by entering the name of the musical track "Unforgettable". After the user has made the change, the processor reads the identification code 3 (in this case, it is the name of the musical track "Unforgettable") entered by the user and searches for the corresponding audio track in the memory means 5. If the audio track is not found, the processor 3 processes, namely creates, the alert message and displays it on the display means 7. For example, the text of the message is: "Warning! The song 'xyz' is not present in memory." Displaying said message relating to said second occurrence has the advantage that the user would not expect to create a presentation to find that the audio track is not present in the memory means 5.

The method according to the invention can be implemented via a computer program product loadable in a memory 5 located in the apparatus 1 and comprising software code portions adapted to implement the method itself.

From the foregoing description, therefore, the characteristics of the present invention, as well as its advantages become evident.

A first advantage of the method and apparatus according to the present invention is to associate an audio track with one or more images in such a way that the association is available whenever the user wants to create a slideshow of images with the accompanying music.

A second advantage of the method and apparatus according to the present invention is to speed up the process of creating the presentation of images.

A third advantage of the method and apparatus according to the present invention is that of obtaining the audio tracks of the accompanying music of the presentation even if not present in the memory associated with the apparatus.

There are numerous possible variants to the method for the sequential presentation of images with enhanced functionality, and apparatus thereof, without departing from the principles of novelty inherent in the inventive idea, as it is also clear that in its practical implementation forms of the illustrated details may be different, and the same may be replaced with technically equivalent elements.

Therefore it is easily understandable that the present invention is not limited to a method for the sequential presentation of images with enhanced functionality, and apparatus thereof, but is liable to various modifications, improvements, substitutions of parts and equivalent elements without departing from the inventive idea, as is better clarified in the following claims.

It should be noted that in the previous description many times an audio track is considered to be a music file, but the invention can be implemented even in the case that an audio track is made by a voice message coded in accordance with one of the known digital audio formats like MP3, AAC, WMA, etc. The important is that this audio track has a unique identification code to be possibly associated with an image stored in the memory 5.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A method for sequentially presenting images comprising at least one image, and carried out by way of a processor configured to display said images on a display means connected to the processor, said method comprising the steps of:

associating a first audio track to at least one first image stored in a memory means associated with said processor;

associating a second audio track to at least one second image stored in said memory means;

selecting said at least one first image and said at least one second image for sequential presentation;

reproducing, by way of said processor and said display means, said at least one first image for a first length of time of said first audio track, acoustically reproducing said first audio track on a sound producing means connected to said processor;

subsequently reproducing, by means of said processor and said display means, said at least one second image for a second length of time of said second audio track, acoustically reproducing said second audio track on said sound producing means;

wherein said step of associating a first audio track to the at least one first image and said step of associating a second audio track to the at least one second image provide for storing a first identification code of the first audio track in first metadata of said at least one first image, and storing a second identification code of the second audio track in second metadata of said at least one second image;

wherein said first metadata and said second metadata can be modified by way of an operation of dragging an icon of said first audio track on an icon of said at least one first image, in which the processor automatically memorizes said first identification code of said first audio track in said first metadata; and wherein said second metadata can be modified by way of an operation of dragging an icon of said second audio track on an icon of said at least one second image, in which the processor automatically memorizes said second identification code of said second audio track in said second metadata.

2. The method according to claim 1, further comprising:

reading, in said first metadata of said at least one first image, said first identification code of said first audio track;

reading, in the second metadata of said at least one second image, the second identification code of the second audio track; and searching, in said memory means, said first audio track corresponding to the first identification code, and respectively said second audio track corresponding to said second identification code, for simultaneous playback of said at least one first image with said first audio track followed by simultaneous playback of said at least one second image with said second audio track.

3. The method according to claim 2;

wherein, in a case that more than one image is associated to one of said audio tracks, a temporal order of presenting said more than one image is determined on the basis of taken dates of the images.

4. The method according to claim 2;

wherein, in a case that more than one image is associated to one of said audio tracks, a temporal order of presenting said more than one image is determined on the basis of content of the images.

5. The method according to claim 1, further comprising:

modifying said first length of time of said first audio track, said second length of time of said second audio track, or both.

6. The method according claim 1;

wherein at least one of said first identification code and said second identification code comprises at least one datum selected from the group consisting of:

a file name, a name of the musical track, a name of the author, an alphanumeric code of said first audio track, and an alphanumeric code of said second audio track.

7. The method accordingly to claim 1;

wherein said first metadata and said second metadata comprise a field relative to said first associated audio track; and said second metadata comprises a field relative to said second associated audio track.

8. The method according to claim 1, further comprising:

modifying said first metadata and said second metadata by inserting said identification code of said first chosen audio track and said identification code of said second audio track, respectively.

9. The method according claim 1, further comprising:

calculating, for said first audio track, a viewing time of each single image associated to the first audio track; and calculating, for said second audio track, a viewing time of each single image associated to the second audio track.

10. The method according claim 1;

wherein a modifiable temporal order is provided of said first and second audio track.

11. The method according to claim 1;

wherein at least one of said audio tracks is made by a voice message coded in accordance with a digital audio format.

12. An apparatus for the sequentially presenting images, the apparatus comprising:

a memory means; and a processor associated to the memory means, and configured to connect to a display and an acoustic producing means;

wherein said apparatus is configured to implement the method according to claim 1.

13. A method for sequentially presenting images comprising at least one image, and carried out by way of a processor configured to display said images on a display means connected to the processor, said method comprising the steps of:

associating a first audio track to at least one first image stored in a memory means associated with said processor;

associating a second audio track to at least one second image stored in said memory means;

selecting said at least one first image and said at least one second image for sequential presentation;

reproducing, by way of said processor and said display means, said at least one first image for a first length of time of said first audio track, acoustically reproducing said first audio track on a sound producing means connected to said processor;

subsequently reproducing, by means of said processor and said display means, said at least one second image for a second length of time of said second audio track, acoustically reproducing said second audio track on said sound producing means;

wherein said step of associating a first audio track to the at least one first image and said step of associating a second audio track to the at least one second image provide for storing a first identification code of the first audio track in first metadata of said at least one first image, and storing a second identification code of the second audio track in second metadata of said at least one second image;

reading, in said first metadata of said at least one first image, said first identification code of said first audio track;

reading, in the second metadata of said at least one second image, the second identification code of the second audio track; and searching, in said memory means, said first audio track corresponding to the first identification code, and respectively said second audio track corresponding to said second identification code, for simultaneous playback of said at least one first image with said first audio track followed by simultaneous playback of said at least one second image with said second audio track;

wherein, when the search in said memory means of said first audio track corresponding to said first identification code is unsuccessful, said first audio track is downloaded from a second remote server arranged for the distribution of music, accessible through an Internet network by said apparatus, and said first audio track is stored in said memory means, before presenting the at least one first image.

14. The method according to claim 13, further comprising:

alerting a user via a visual communication, an acoustic communication, or both, if there is no network access to said second remote server from said apparatus.

15. A method for sequentially presenting images comprising at least one image, and carried out by way of a processor configured to display said images on a display means connected to the processor, said method comprising the steps of:

associating a first audio track to at least one first image stored in a memory means associated with said processor;

associating a second audio track to at least one second image stored in said memory means;

selecting said at least one first image and said at least one second image for sequential presentation;

reproducing, by way of said processor and said display means, said at least one first image for a first length of time of said first audio track, acoustically reproducing said first audio track on a sound producing means connected to said processor;

subsequently reproducing, by means of said processor and said display means, said at least one second image for a second length of time of said second audio track, acoustically reproducing said second audio track on said sound producing means;

wherein said step of associating a first audio track to the at least one first image and said step of associating a second audio track to the at least one second image provide for storing a first identification code of the first audio track in first metadata of said at least one first image, and storing a second identification code of the second audio track in second metadata of said at least one second image;

alerting a user via a visual communication, an acoustic communication, or both, of a fact that said first audio track, said second audio track, or both are not present in said memory means, and alerting the user that said apparatus attempts to recover said first audio track, said second audio track, or both, from a second remote server.

16. The method according to claim 15;

wherein said communication occurs during creation of said sequential presentation of images.

17. The method according to claim 15;

wherein said communication occurs during manual editing of said first metadata, said second metadata, or both.

18. A method for sequentially presenting images comprising at least one image, and carried out by way of a processor configured to display said images on a display means connected to the processor, said method comprising the steps of:

associating a first audio track to at least one first image stored in a memory means associated with said processor;

associating a second audio track to at least one second image stored in said memory means;

selecting said at least one first image and said at least one second image for sequential presentation;

reproducing, by way of said processor and said display means, said at least one first image for a first length of time of said first audio track, acoustically reproducing said first audio track on a sound producing means connected to said processor;

subsequently reproducing, by means of said processor and said display means, said at least one second image for a second length of time of said second audio track, acoustically reproducing said second audio track on said sound producing means;

wherein said step of associating a first audio track to the at least one first image and said step of associating a second audio track to the at least one second image provide for storing a first identification code of the first audio track in first metadata of said at least one first image, and storing a second identification code of the second audio track in second metadata of said at least one second image;

reading, in said first metadata of said at least one first image, said first identification code of said first audio track;

reading, in the second metadata of said at least one second image, the second identification code of the second audio track; and searching, in said memory means, said first audio track corresponding to the first identification code, and respectively said second audio track corresponding to said second identification code, for simultaneous playback of said at least one first image with said first audio track followed by simultaneous playback of said at least one second image with said second audio track;

wherein, when the search in said memory means of said second audio track corresponding to said second identification code is unsuccessful, said second audio track is downloaded from a second remote server arranged for the distribution of music, accessible through an Internet network by said apparatus, and said second audio track is stored in said memory means, before presenting the at least second first image.

19. The method according to claim 18, further comprising:
   alerting a user via a visual communication, an acoustic communication, or both, if there is no network access to said second remote server from said apparatus.

* * * * *